United States Patent [19]

Hanas et al.

[11] 4,202,522
[45] May 13, 1980

[54] INJECTION MOLDING APPARATUS FOR ACCOMMODATING VARIOUS SIZES OF MOLDING DIE INSERTS

[75] Inventors: Walter E. Hanas, Roslyn; Ronald R. Sutko, Levittown, both of Pa.

[73] Assignee: Honeywell Inc., Minneapolis, Minn.

[21] Appl. No.: 941,327

[22] Filed: Sep. 11, 1978

Related U.S. Application Data

[62] Division of Ser. No. 807,227, Jun. 16, 1977, Pat. No. 4,158,910.

[51] Int. Cl.² .......................... B29C 1/00; B29F 1/00
[52] U.S. Cl. .................................... 249/102; 425/185; 425/186; 425/192 R
[58] Field of Search ............... 425/182, 183, 185, 186, 425/190, 191, 192, 451.2, 577, 588, 595, 78, 46, 196, DIG. 57, 102, 103, 195; 249/102, 98, 99, 100, 101

[56] References Cited

U.S. PATENT DOCUMENTS

| | | | |
|---|---|---|---|
| 2,554,110 | 5/1951 | Lemm | 249/98 X |
| 3,158,903 | 12/1964 | Fischer et al. | 425/186 |
| 3,448,488 | 6/1969 | Kiraly | 425/192 |
| 3,484,901 | 12/1969 | Anderson | 425/191 |
| 3,871,611 | 3/1975 | Taketa | 249/102 |
| 3,975,131 | 8/1976 | Bergounhon | 249/101 X |
| 4,013,392 | 3/1977 | Smith | 425/451.2 X |

*Primary Examiner*—J. Howard Flint, Jr.
*Attorney, Agent, or Firm*—Laurence J. Marhoefer; Lockwood D. Burton; Mitchell J. Halista

[57] ABSTRACT

An apparatus for accommodating various sizes of molding die inserts in an injection molding machine using a pair of injection die support frames to hold either injection molding die inserts fitting directly into corresponding recesses in confronting faces of the die support frames or second injection molding die inserts combined with respective injection die insert adaptors fitting into the recesses in the die support frames. An adjustable stop for the confronting faces of the die supports is provided in confronting face of one of the die support frames to maintain a uniform parting line between the die support frames and the die inserts by providing a selectively elevatable contact surface above the parting line facing surface of the one die support frame. The selectively elevatable contact surface is located on the head of a threaded screw held in the one die support frame and is adjusted to contact the confronting face of the other die support frame when the confronting faces of the die inserts are in contact.

4 Claims, 5 Drawing Figures

INJECTION MOLDING APPARATUS FOR ACCOMMODATING VARIOUS SIZES OF MOLDING DIE INSERTS

This is a divisional of application Ser. No. 807,227 filed on June 16, 1977, now U.S. Pat. No. 4,158,910.

BACKGROUND OF THE INVENTION

1. Field Of The Invention

The present invention relates to injection molding machines. More specifically, the present invention is directed to an apparatus for accommodating different size injection die inserts in an injection molding machine.

2. Description Of The Prior Art

Injection molding machines using a pair of die frames for carrying respective halves of a pair of injection molding die inserts which are clamped together along a confronting face parting line to form an internal injection molding cavity in the die inserts with means for supplying a plastic material to the cavity to form a desired injection molded product are well-known in the art. An example of such an injection molding machine is manufactured by Polymer Machinery Corporation of Berlin, Conn. and is identified as an Arburg "allrounder" injection molding machine. Die inserts and die frames for such an injection molding machine are manufactured for a particular model of an injection molding machine and are used in matched pairs. An example of such die holders or frames and die inserts are those made by the Master Unit Die Products of Greenville, Michigan and identified as "MUD" frames and unit die inserts. These frames and inserts are designed to be used in matching pairs wherein the large frames are each arranged to accommodate in a recess of the frame a corresponding die insert. The confronting faces of the frames and the die inserts determine the parting line of the molded product. In order to maintain dimensional stability, the frames are of a heavy construction, generally steel, and, in order to change from one size die insert to another die insert, the frame for the first die insert is removed from the machine and replaced with a frame for the second die insert. Inasmuch as this prior art operation involves a substantial rearrangement of the molding machine and involves the handling of a heavy frame, the operator time and down-time for the injection molding machine are a substantial part of the molding process. Since such a changeover may occur daily or even more than once a day, the changeover time is a significant part of the cost of producing the molded product. Further, such prior art frames and die inserts have no provision for accommodating a die insert which extends past the confronting faces of the frames inasmuch as the frames and die inserts are arranged to have coplaner faces to determine the parting line and to distribute the compression forces therebetween. Accordingly, in order to eliminate these problems associated with the prior art injection molding apparatus, it is desirable to provide frames and die inserts which are interchangeable while also accommodating non-coplaner die inserts and frames.

SUMMARY OF THE INVENTION

An object of the present invention is to provide an improved die insert and frame apparatus for accommodating different size die inserts.

Another object of the present invention is to provide an improved die and frame insert which is adaptable to non-coplaner die and frame inserts.

In accomplishing these and other objects, there has been provided, in accordance with the present invention, a frame and die insert apparatus including adaptor inserts for adapting large die insert frames to accommodate different sizes of die inserts. The frame is provided with a selectively elevatable surface portion to maintain a parting line contact between the confronting frame surfaces while accommodating non-coplaner die inserts.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
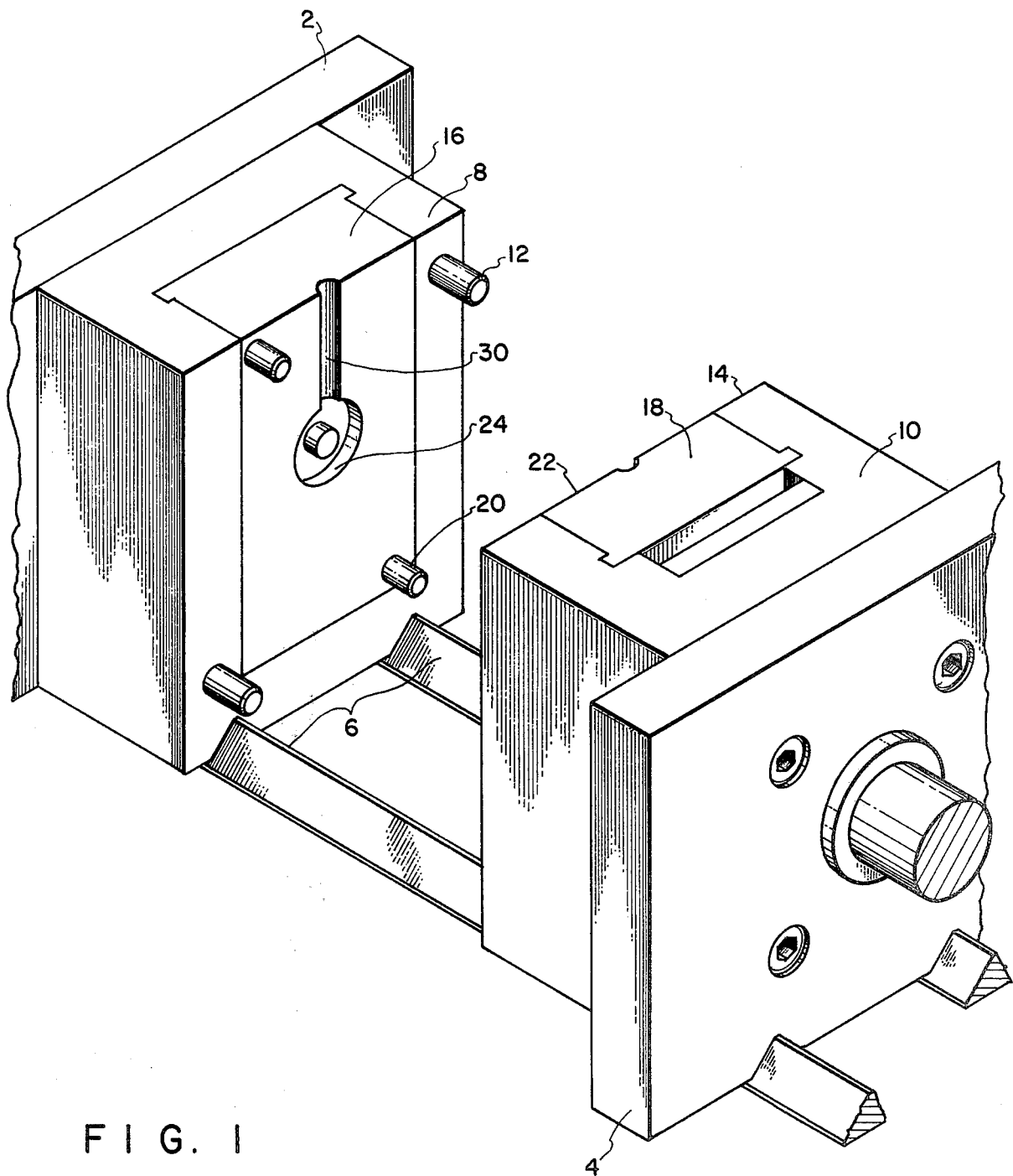
FIG. 1 is a pictorial view of a first size of a prior art frame and die insert.
Figure 2:
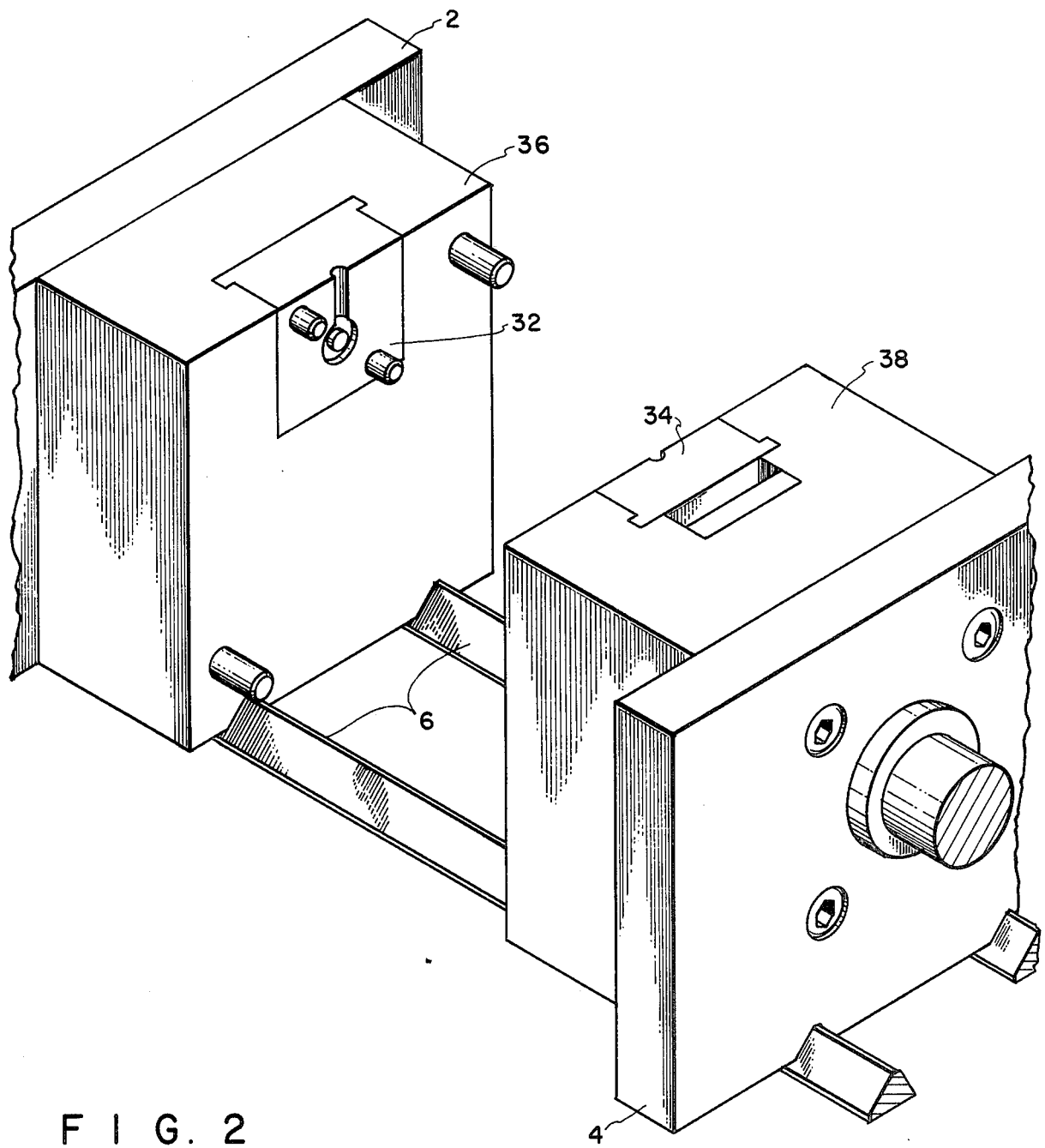
FIG. 2 is a pictorial view of a second size of a prior art frame and die insert.
Figure 3:
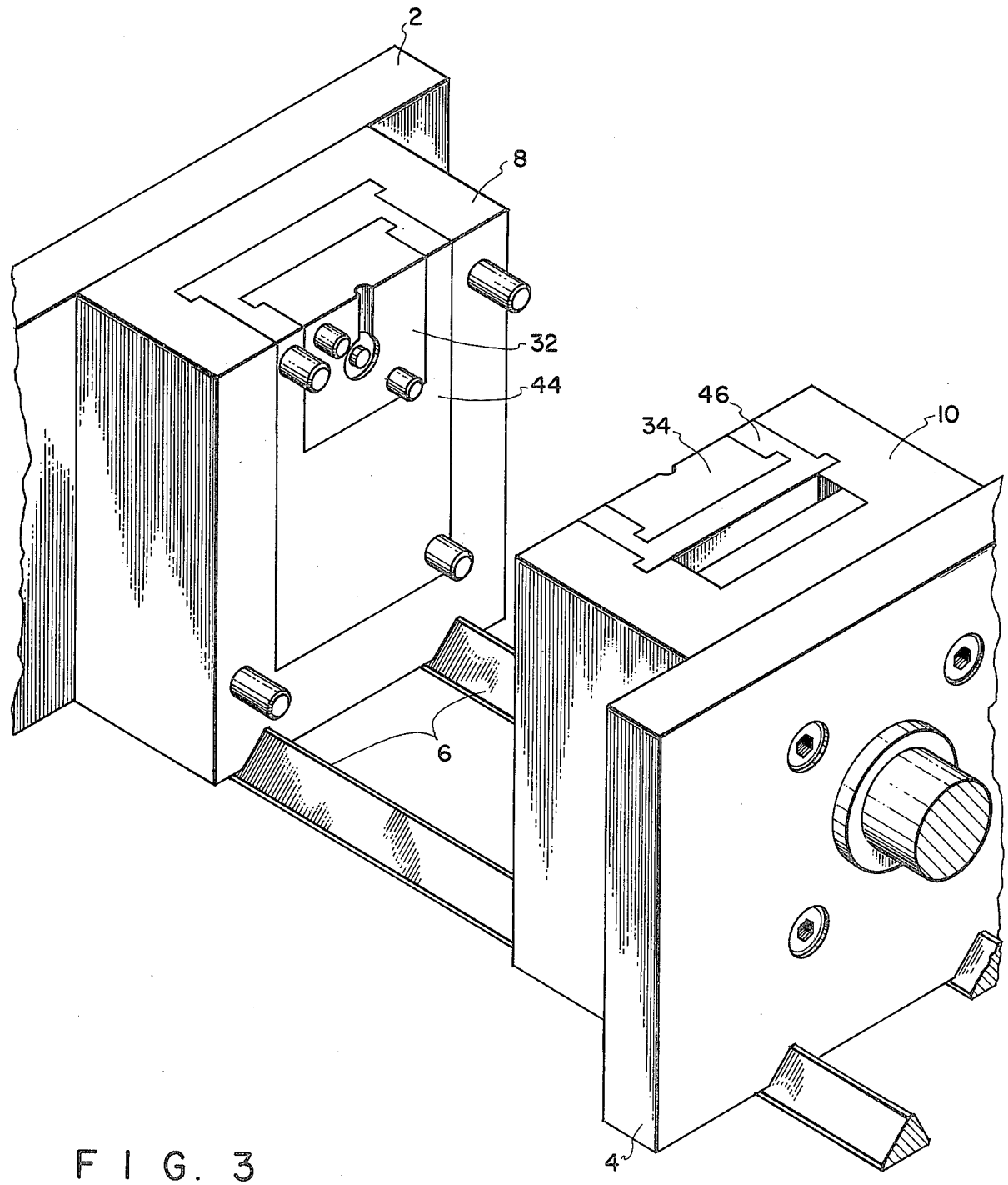
FIG. 3 is a pictorial view of a frame and die insert apparatus embodying the present invention.

As shown in FIGS. 1 and 2, the prior art injection molding apparatus included a pair of mold frame and die supports 2 and 4 which were mounted on machine ways 6 to enable the supports 2 and 4 to be brought together along confronting faces by any suitable means (not shown), e.g., a motor driven machine screw advance driving the supports 2 and 4 into juxtaposition on the ways 6. Each support has a confronting face recess for accommodating an injection molding die frame. For example, the first support 2 has a recess for accommodating a die frame 8. Similarly, the second support 4 has a recess for accommodating a die frame 10. The die frames 8 and 10 are a matched set whereby they are arranged to mate along confronting faces upon the closure of the supports 2 and 4 on the ways 6. In order to provide for alignment of the frames and to maintain this alignment during the pressure injection of the molding material into the mold die, one of the frames, e.g., frame 8, is provided with a plurality of forwardly projecting pins 12 while the other frame, e.g., frame 10, is provided with a plurality of matching recesses 14. Further, in order to securely hold the frame in the recess of the support, the recess may be in the form of a T-slot with the frames 8 and 10 having outwardly projecting ridges to fit into the legs of the T while the recess contacting surfaces of the frame 8, 10 are a tight sliding fit into the corresponding recess of the frame 2, 4. Each of the frames 8, 10 is provided with a similar T-slot for holding respective ones of a pair of injection molding tool dies. For example, the frame 8 is arranged to support a molding die insert 16 while the frame 10 is arranged to support a matching die insert 18. The die inserts 16 and 18 are also provided with forwardly projecting pins and recesses to maintain the alignment of the die inserts during the injection molding cycle. Thus, the die insert 16 has a pair of pins 20 while the die insert 14 has a pair of recesses 22.

The confronting faces of the die inserts 16, 18 are each provided with a recess forming a portion of the item to be molded by the injection molding cycle. Thus, half of the injection molded part may be found in one of the die inserts, e.g. 16, while the other half of the part is found in the other die insert 18. Accordingly, a recess 24 defining a part to be molded is formed in a face of the die insert 16 while a recess (not shown) defining the other half of the part to be formed is located in a confronting face of the die insert 18 and aligned with the recess 24 to form a composite recess when the die insert confronting faces are brought into contact by a movement of the supports 2 and 4 on the ways 6. A sprue 30 may be provided in one of the die inserts to allow a source of molding material to be connected thereto whereby the molding material is forced under pressure into the recesses 24 and the mating recess not shown when the die inserts are brought together to form a composite recess in the die inserts 16 and 18. When the molding operation is completed, the supports 2 and 4 are separated which effectively separates the die inserts 16 and 18 and the completed molded part may be removed from the one of the die inserts 16, 18 in which it is being retained. Similarly, in FIG. 2 there is also shown the pair of frame supports 2 and 4 on the ways 6 with different pairs of die inserts 32, 34 and die support frames 36, 38 therein. As will be seen from FIG. 2 the die inserts 32, 34 are of a substantially smaller size and, accordingly, fit into smaller recesses in the corresponding frames 36 and 38. Thus, these smaller inserts 32, 34 are used to provide die molding recesses for substantially smaller molded parts than those to be molded by the larger recesses found in the larger die inserts shown in FIG. 1 and the frames and die inserts of FIGS. 1 and 2 are not interchangeable. The operation of the molding process for the apparatus shown in FIG. 2 is substantially the same as that described above with respect to the apparatus shown in FIG. 1.

In the prior art use of the die molding apparatus shown in FIGS. 1 and 2, a die changeover operation from a molding of a part defined by the large die inserts shown in FIG. 1 to a molded part defined by the small die inserts shown in FIG. 2 requires the operator to change the frames and dies to correspond to the molding operation to be achieved. Inasmuch as the frames and die inserts are usually made of steel to provide a rigid backing for the molding operation, the parts to be interchanged are of a substantial size and weight. Accordingly, the changeover operation produces a significant unprofitable downtime for the molding machine while the changeover operation is effected. Since such changeover operations could occur daily or even more frequently, the production line operation of these molding machines is seriously hampered.

The present invention is directed to an apparatus for avoiding the extensive prior art downtime of the molding machine by enabling the die changeover operation to be achieved quickly and simply. Specifically, the apparatus of the present invention includes a pair of adaptors 44, 46 to be used with respective ones of the large frames 8, 10 for accommodating the small die inserts 32, 34 therein. Thus, only the adaptors 44, 46 and small die inserts 32, 34 are actually removed from the supports 2, 4, and the frames 8, 10 having the large recesses for holding the large die inserts 16, 18 are left in the supports 2, 4. When the small die inserts 32, 34 are to be used, the adaptors 44, 46 are first inserted in respective ones of the large recesses of the large frames 8, 10. The small die inserts 32, 34 are subsequently inserted into respective ones of the adaptors 44, 46. On the other hand, the use of the large die inserts 16, 18 requires only the removal of the adaptors 44, 46 and small die inserts 32, 34. Thus, the die insert changeover operation is easily and quickly effected with a minimum of operator effort and machine downtime. The adaptors 44, 46 are, of course, provided with a T-shape end compatible with the T-slot recess in the large support frames 8, 10. The overall changeover for the die inserts, accordingly, involves only the handling of the die inserts and the adaptors 44, 46. In fact, the small die inserts can be inserted into the adaptors 44, 46 before the changeover whereby the combination of adaptor and die insert may be inserted into the frames in place of the large die inserts in a simplified changeover operation.

In order to provide for an injection molding capability of the present invention for die inserts which when seated in the frames 8, 10 project past the confronting faces of the frames 8, 10 a parting line contact must be reestablished on the confronting faces of the frames 8, 10 since otherwise the die inserts are brought into contact on their confronting faces before the confronting faces of the frames 8, 10.

Figure 4:
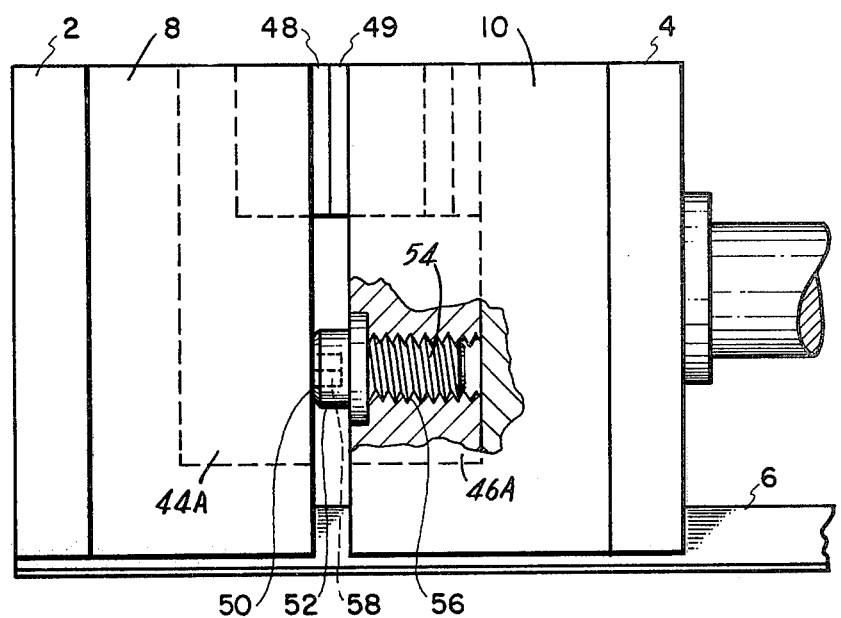
FIG. 4 is a side view of a frame and die insert showing a parting line adjustment for non-coplaner die inserts and FIG. 5 is a front view of a frame having the parting line adjustment apparatus shown in FIG. 4.
Figure 5:
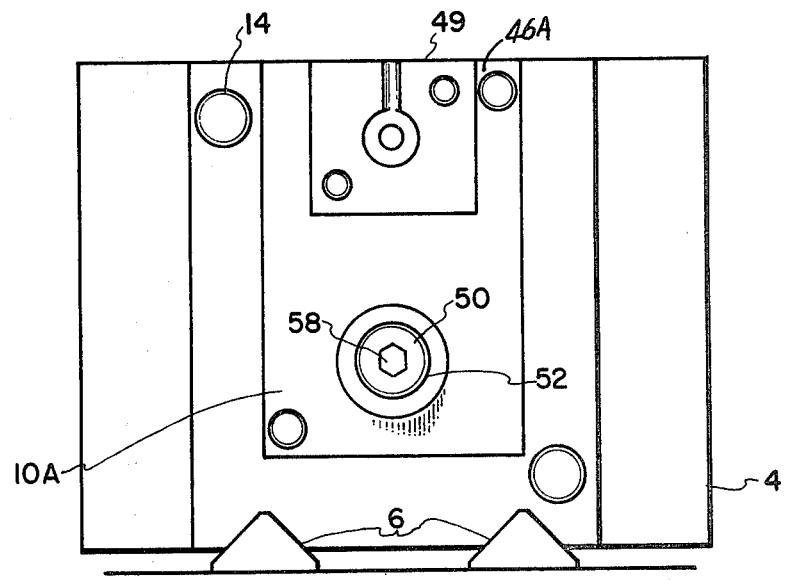

Further, the use of die inserts and adapters will even more frequently result in the use of die inserts which project beyond the confronting faces of their respective adapters. Accordingly, a provision for compensating for the use of such projecting die inserts by the use of a selectively positionable contact surface is illustrated in FIGS. 4 and 5 with respect to adaptors 44A, 46A and corresponding die inserts 48, 49. Specifically, one of the adaptors, e.g., adaptor 46A, is provided with a selectively extensible contact surface 50 on its adaptor confronting face. This surface 50 is located on the head of a balancing screw 54 threaded into a threaded hole 56 in the one of the pair of adaptors 46A. The head of the screw is provided with a characterized recess for admitting an adjusting tool (not shown). Thus, in order to provide for a balancing of the closure pressures exerted by the frames 8, 10 which are urged toward each other by the operation of the injection molding machine via a bringing together of the supports 2, 4, the screw 54 is initially adjusted until the head surface 50 thereof is elevated into contact with the other adaptor, i.e., adaptor 44A, when the confronting faces of the die inserts held 48, 49 by the adaptors 44A, 46A are brought into contact. Thus, the selectively elevatable screw head surface 50 eliminates any skewing effect of the large frames 8, 10 which would prevent a tight closure between the confronting faces of the die inserts. Further, the closing pressures are balanced between the die inserts and the selectively postionable screw 54 to prevent malformation of the manufactured injection molded parts and to avoid the necessity for manual adjustments to process temperatures and pressures.

Accordingly, it may be seen that there has been provided, in accordance with the present invention an improved apparatus for injection molding for accommodating different size and non-coplaner die inserts.

The embodiments of the invention in which an exclusive property or privilege is claimed are defined as follows:

1. An injection molding die insert support apparatus comprising a die insert support frame having at least one surface face, a recess in said face, a plurality of die inserts having different size mold cavities with a first one of said die inserts having a large mold cavity and being sized to mate with said recess in said support frame and a second one of said die inserts having a smaller mold cavity than the mold cavity of the first insert and said second one of said die inserts being smaller than said recess and an adaptor for adapting said second one of said die inserts to mate with said recess.

2. An apparatus as set forth in claim 1 wherein said adaptor is arranged to mate with said recess in the same manner as a die insert arranged to mate directly with said recess in said support frame while providing a second recess therein for supporting a mating one of said smaller die inserts therein.

3. An apparatus as set forth in claim 2 and including a selectively elevatable surface located adjacent to said second recess and being selectively elevatable between a first position against a surface adjacent to said second recess and a position elevated above said surface adjacent to said second recess.

4. An apparatus as set forth in claim 3 wherein said selectively elevatable surface is a head surface of a threaded element, said head surface being parallel to said surface adjacent to said second recess and further including threaded hole means in said adaptor for receiving a threaded portion of said threaded element.

* * * * *